United States Patent [19]

Kayashima et al.

[11] Patent Number: 5,488,427
[45] Date of Patent: Jan. 30, 1996

[54] TELEVISION SYSTEM INCLUDING TELEVISION SET, AND ACCESSORY DEVICES CONTROLLED BY A SINGLE REMOTE CONTROL DEVICE

[75] Inventors: Kazuhiro Kayashima, Hirakata; Toshihiko Kurosaki, Kobe; Yo Egusa, Kyoto; Hiroshi Atuta; Hiroshi Yamamoto, both of Katano, all of Japan

[73] Assignee: Matsushita Electric Industrial Co., Ltd., Osaka, Japan

[21] Appl. No.: 229,455

[22] Filed: Apr. 18, 1994

[30] Foreign Application Priority Data

Apr. 16, 1993 [JP] Japan .................................. 5-090111
Apr. 22, 1993 [JP] Japan .................................. 5-095803

[51] Int. Cl.⁶ .......................... H04N 5/50; H04N 5/268
[52] U.S. Cl. ...................... 348/569; 348/836; 348/706; 348/734
[58] Field of Search ...................... 348/836, 838, 348/839, 61, 729, 734, 906, 840, 552, 705, 706, 569; H04N 5/50, 5/268

[56] References Cited

U.S. PATENT DOCUMENTS

| | | |
|---|---|---|
| 3,973,091 | 8/1976 | Kaminski . |
| 3,996,429 | 12/1976 | Chu et al. . |
| 4,245,871 | 1/1981 | Rex . |
| 4,314,117 | 2/1982 | Ditzig . |
| 4,319,099 | 3/1982 | Asher . |
| 4,396,941 | 8/1983 | Nishimura et al. .................. 348/729 X |
| 4,400,596 | 8/1983 | Fukukura et al. . |
| 4,425,586 | 1/1984 | Miller ..................................... 348/552 |
| 4,477,700 | 10/1984 | Balash et al. . |
| 4,566,034 | 1/1986 | Harger et al. . |
| 4,621,259 | 11/1986 | Schepers et al. .................... 348/836 X |
| 4,626,847 | 12/1986 | Zato . |
| 4,626,892 | 12/1986 | Nortrup et al. .......................... 348/569 |
| 4,635,110 | 1/1987 | Weinblatt . |
| 4,658,956 | 4/1987 | Takeda et al. .......................... 348/838 |
| 4,706,121 | 11/1987 | Young . |
| 4,821,102 | 4/1989 | Ichikawa et al. .................... 348/569 X |
| 4,825,200 | 4/1989 | Evans et al. . |
| 4,892,981 | 1/1990 | Soloway et al. . |
| 4,907,082 | 3/1990 | Richards ................................ 348/569 |
| 4,987,275 | 1/1991 | Miller et al. . |
| 5,047,867 | 9/1991 | Strubbe et al. ........................ 348/569 |
| 5,144,451 | 9/1992 | Yamamoto et al. ............... 348/552 X |
| 5,187,469 | 2/1993 | Evans et al. . |
| 5,210,611 | 5/1993 | Yee et al. ............................... 348/569 |
| 5,214,622 | 5/1993 | Nemoto et al. ..................... 348/734 X |
| 5,237,417 | 8/1993 | Hayashi et al. ........................ 348/569 |
| 5,303,057 | 4/1994 | Davidow et al. ...................... 348/836 |
| 5,313,027 | 5/1994 | Inoue et al. . |
| 5,341,166 | 8/1994 | Garr et al. .......................... 348/906 X |
| 5,416,508 | 5/1995 | Sakuma et al. ...................... 348/906 X |

*Primary Examiner*—Victor R. Kostak
*Attorney, Agent, or Firm*—Ratner & Prestia

[57] ABSTRACT

A television system which includes a television set with cathode-ray tube, a VCR deck, a disc player, a tape deck and a radio tuner in one unit operated and controlled by a single remote control device. The cathode-ray tube displays a menu including a guide to help one use the remote control device. The television system also includes automatically selecting a preset or use determined favorite device, e.g. television set, and/or a channel when the system is turned on.

15 Claims, 7 Drawing Sheets

TELEVISION SYSTEM INCLUDING TELEVISION SET, AND ACCESSORY DEVICES CONTROLLED BY A SINGLE REMOTE CONTROL DEVICE

FIELD AND BACKGROUND OF THE INVENTION

The present invention relates to a television system and a remote control device.

Hitherto, a television system with a VCR apparatus or a television system equipped with a radio receiver have been known. As the VCR apparatus and CD apparatus are distributed widely, however, the software products of music and video or CD-ROM and other media are used as information media have been produced more and more, which gives rise to the needs of enjoying video and music, or utilizing information readily by one unit.

OBJECT AND SUMMARY OF THE INVENTION

A television system of the invention comprises a chassis incorporating a VCR deck, disc player of CD, a tape deck, and a radio tuner, and a cabinet of television set possessing a cathode-ray as a display means. The chassis is fixed to the cabinet.

In a preferred embodiment of this invention, the disc player, the tape deck and the VCR deck have their own media loading slot in the front. And specifically the VCR deck is designed to record and play by loading a tape cassette from the media loading slot in its longitudinal direction. The media loading slot of the VCR deck is disposed at the right side of the front of the VCR deck, while the disc player, the tape deck and the VCR deck have their own front media loading slots disposed in the same direction. The VCR deck is mounted at the left side of the front. And the disc player and the tape deck, which are stacked up and mounted on the chassis, are at the right side of the front of the system. The chassis is fixed to the cabinet so that each media loading slot faces at the same direction as the front side of the cathode-ray tube faces.

Moreover, in another embodiment of the present invention, the television system includes a remote control device comprising a main power switch means for turning on and off the main power source of the television system, a device switch means for instructing the selection of devices such as VCR deck, disc player, tape deck, radio tuner and television, a channel switch means for instructing the selection of channel of each device, and signal send means for coding signals of these switch means and sending the coded signals, and a television system comprising signal receive means for receiving and decoding coded signals from the remote control device, a power control means of each device for turning on and off the power source of each device on the basis of the signal from the switch means, channel selection control means for selecting the channel on the basis of the channel selection signal, a clock function means having a memory storing the calendar information and a clock providing the present date and time, a memory means for storing the selection information of each device and channel selection information in relation to the information of date and time set by the clock function means, and control means for controlling the power control means of each device and channel selection control means on the basis of the selection information of each device and channel selection information corresponding to the date and time stored in the memory means.

BRIEF DESCRIPTION OF THE DRAWING FIGURES

Figure 15A:
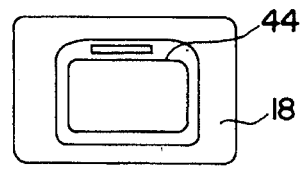
Figure 15B:
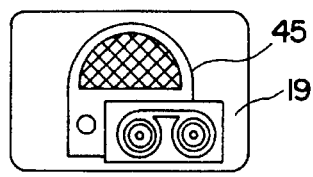
Figure 15C:
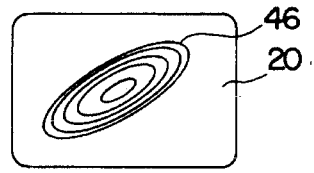

FIGS. 15(a)–(c) are front views of operation buttons in the fifth embodiment of the present invention.

Figure 16A:
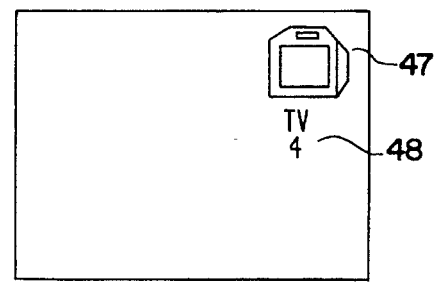
Figure 16B:
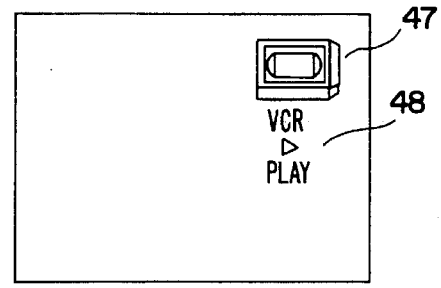

FIGS. 16(a)–(b) are diagrams showing the display of a television screen in the sixth embodiment of the present invention.

Figure 17A:
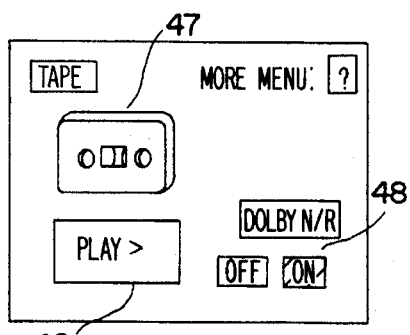
Figure 17B:
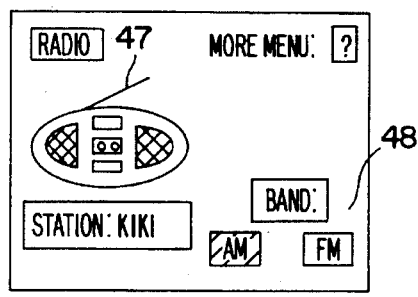
Figure 17C:
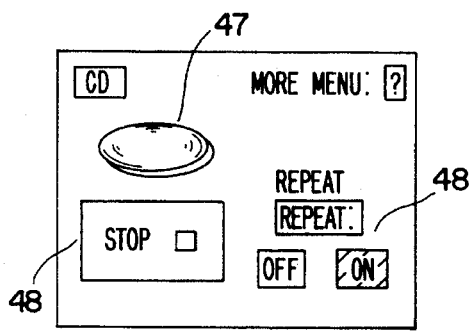

FIGS. 17(a)–(c) are diagrams showing the display of a television screen in the sixth embodiment of the present invention.

Figure 18B:
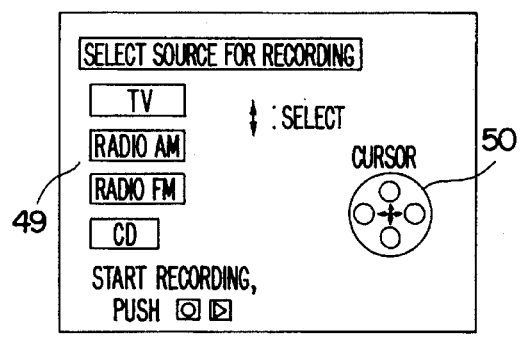
Figure 18A:
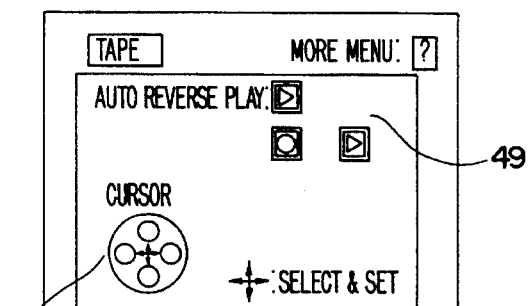

FIGS. 18(a)–(b) are diagrams showing the display of a television screen in the sixth embodiment of the present invention.

Figure 19:
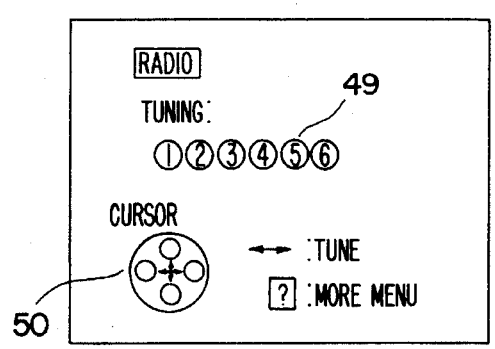
Figure 20:
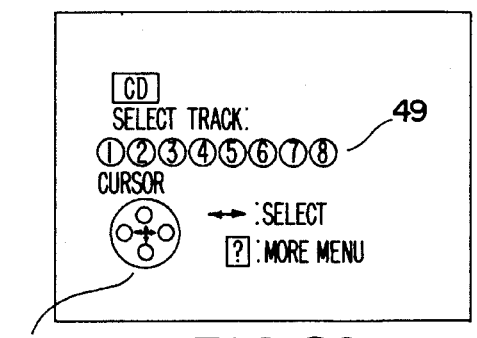
Figure 21:
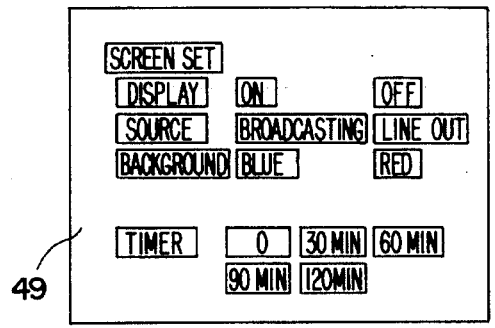

FIGS. 19–21 are diagrams showing the display of a television screen in the sixth embodiment of the present invention.

Figure 22:
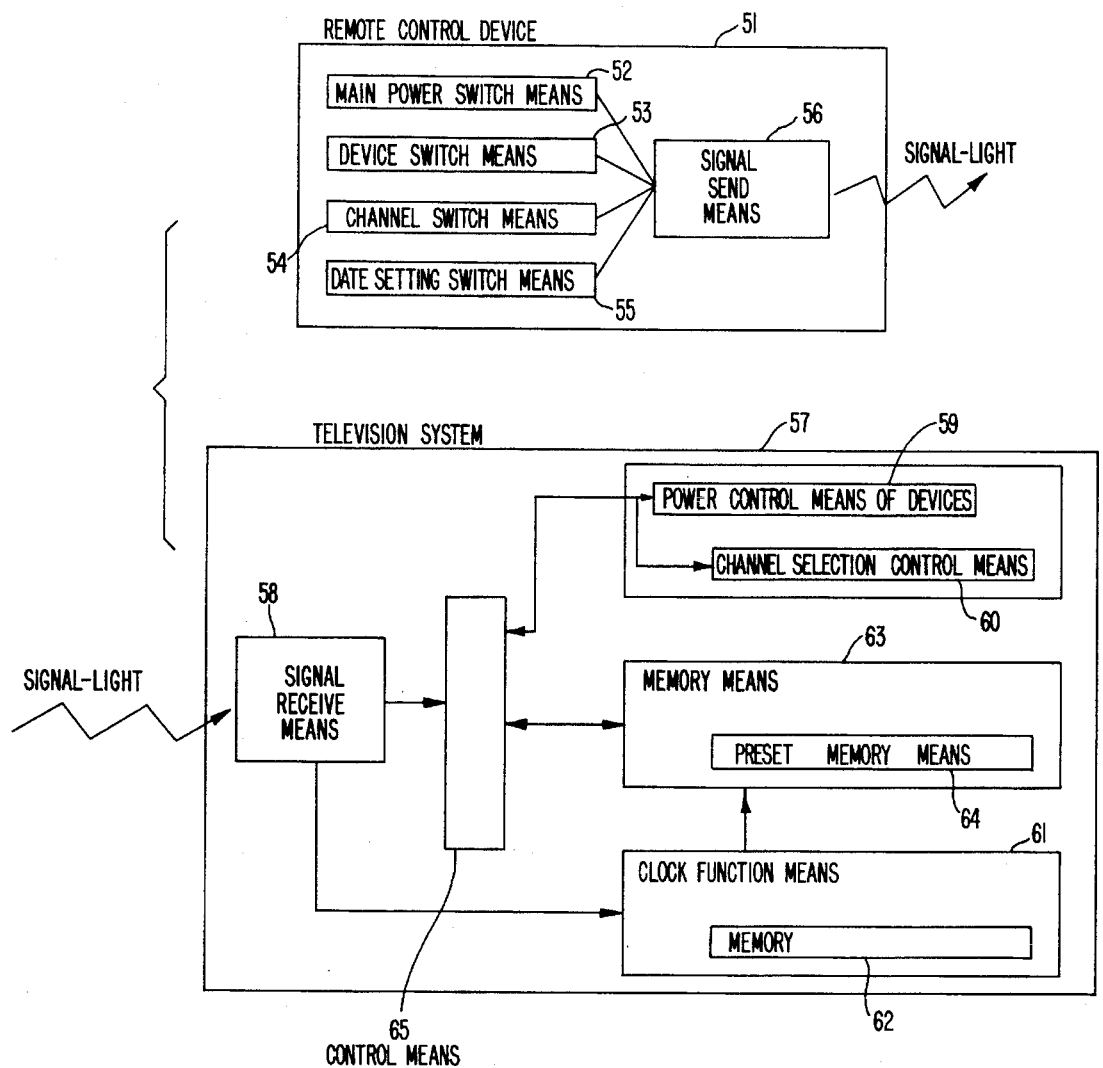

FIG. 22 is a circuit block diagram of the seventh embodiment of the present invention.

DESCRIPTION OF THE PREFERRED EMBODIMENTS (Embodiment 1)

The first embodiment of this invention is described below according to FIG. 1 to FIG. 10. In the television system of the invention, a chassis 1 is fixed in a cabinet 2.

The chassis 1 comprises a VCR deck 3, a disc player 4, a tape deck 5, and a radio tuner 6. The disc player 4, tape deck 5 and VCR deck 3 are provided with media loading slots 9, 10, 11 respectively at the front side. The disc player 4, tape deck 5 and VCR deck 3 have their media loading slots 9, 10, 11 aligned in the same direction. The VCR deck 3 is disposed at the left side of the television system as seen from the front, and the disc player 4 and tape deck 5 are stacked up and mounted on the chassis 1 as disposed at the right side as seen from the front side.

In the VCR deck 3, as shown in FIG. 6 to FIG. 10, a VCR tape cassette 50 is inserted through the media loading slot 9 in the longitudinal direction to be loaded in the VCR deck 3, and the media loading slot 9 is disposed at the right side of the VCR deck 3 as seen from the front side. In FIG. 6 through FIG. 10, part 58 is a tape-loading mechanism, part 59 is a cover unlock button, part 60 is a cover, part 61 is a tape, part 62 is a feed reel, part 63 is a take-up reel, part 64 is a cylinder head, part 65 is an erase head, part 66 is a signal head, part 67 is a pinch roller, and part 68 is a cover unlock pin.

Figure 8:
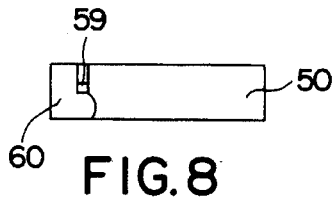
FIG. 8 is a side view of a VCR tape cassette.
Figure 9:
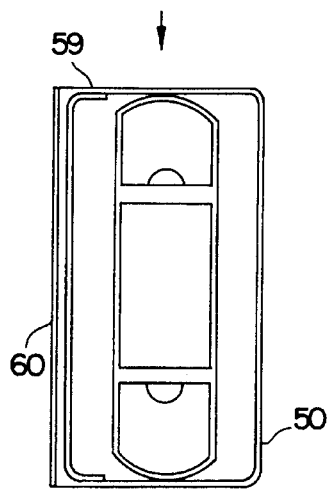
FIG. 9 is a top view of the VCR cassette case.
Figure 10:
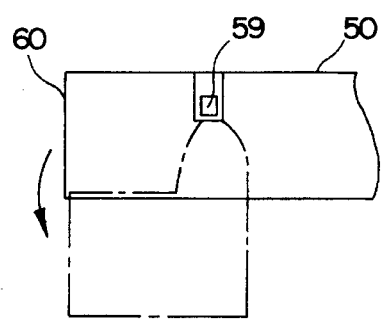
FIG. 10 is a partial side view for explaining the open state of the cover of the VCR cassette case.

If the tape cassette 50 is loaded, as shown in FIG. 8 to FIG. 10, by unlocking the cover 60 by pressing the cover unlock button 59, the cover 60 is opened as indicated by arrow in FIG. 10 to be in the state shown by single dot chain line, and the front face of the tape is exposed. The cover unlock button 59 is provided only at the left side of the cover 60 as seen from the front side of the cover 60 in FIG. 9. Accordingly, if the tape-loading mechanism 58 is disposed at the right side of the media loading slot 9, the cover unlock pin 68 is located near the media loading slot 9, and the cover unlock pin 68 may disturb setting of the tape cassette 50. Therefore, when loading the tape cassette 50 of the VCR deck 3 into the media loading slot 9 in the longitudinal direction, it is preferred that the mechanism 58 is located at the left side as seen from the front side of the VCR deck 3, and that the media loading slot 9 is located at the right side.

Figure 1:
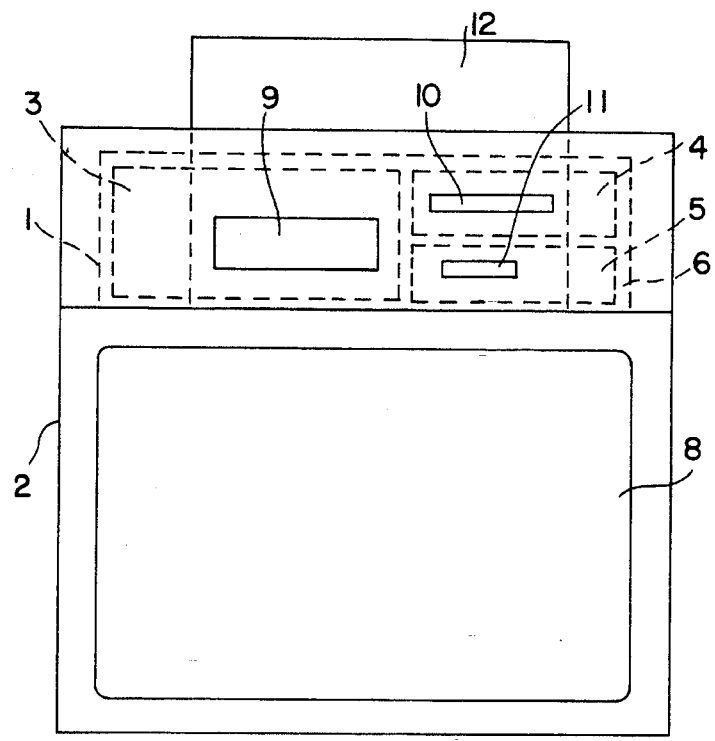
FIG. 1 is a front view of a television system in a first embodiment of the present invention.

As shown in FIG. 1, the media loading slot 10 of the disc player 4 and the media loading slot 11 of the tape deck 5 are disposed at the left side of each apparatus close to the media loading slot 9 as seen from the front side of the television system. As a result, the media loading slots 9 to 11 are located near the middle position of the front face of television system.

The cabinet 2 possesses a cathode-ray tube 8, and the chassis 1 is fixed at the upper side of the cabinet 2 with the media loading slots 9 to 11 facing in the same direction as the front side of the cathode-ray tube 8 faces.

A lid 12 for covering and uncovering the media loading slots 9 to 11 is provided. (See FIGS. 1, 2, 3, and 5)

The cathode-ray tube 8 works as a display for displaying various informations of a television receiver (not shown), VCR deck 3 or disc player 4.

Figure 2:
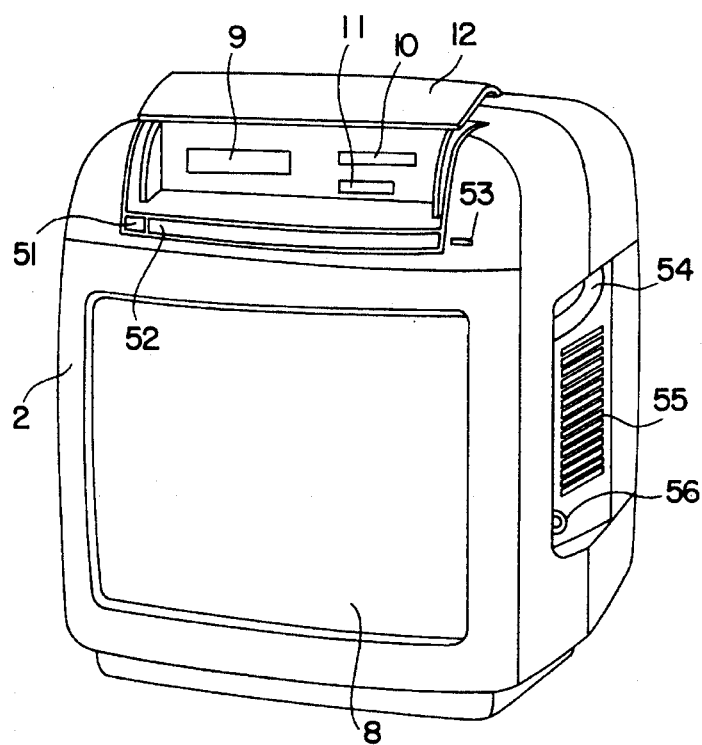
FIG. 2 is a perspective view with the open lid of a television system in the first embodiment of this invention.
Figure 3:
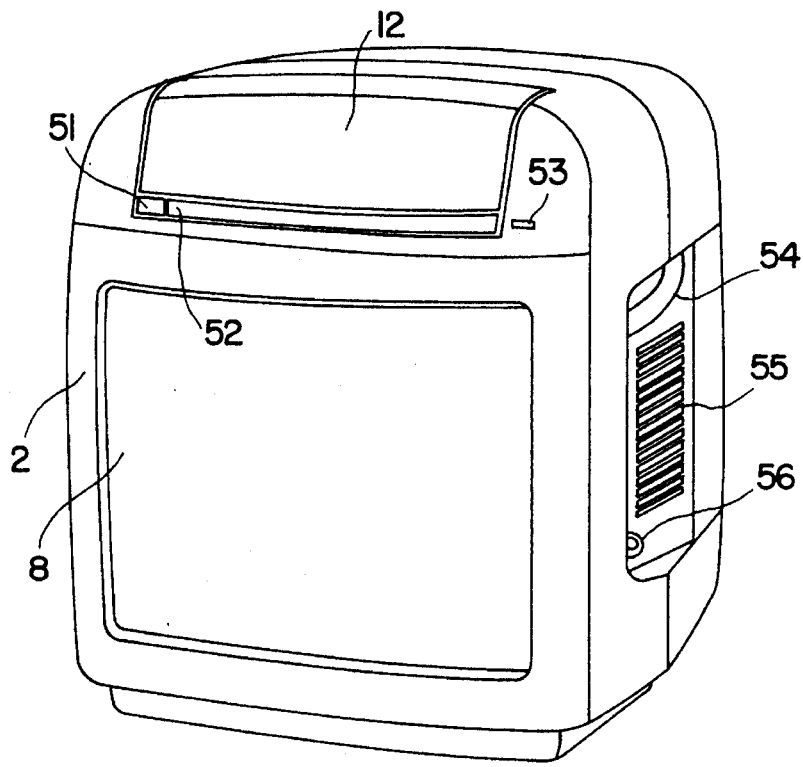
FIG. 3 is a perspective view with the closed lid of a television system in the first embodiment of this invention.
Figure 4:
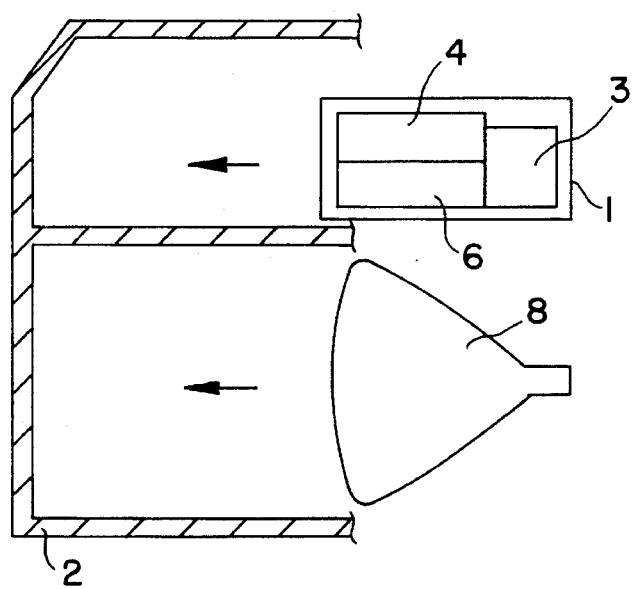
FIG. 4 is a schematic sectional view in a partially disassembled state of the television system.
Figure 5:
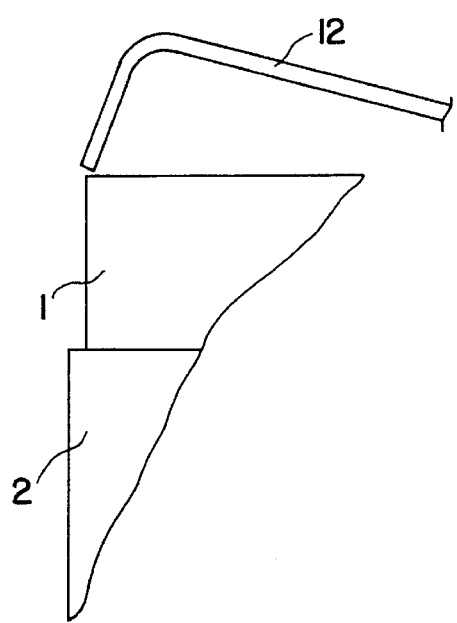
FIG. 5 is a partial sectional view in an open state of the lid of the television system.
Figure 6:
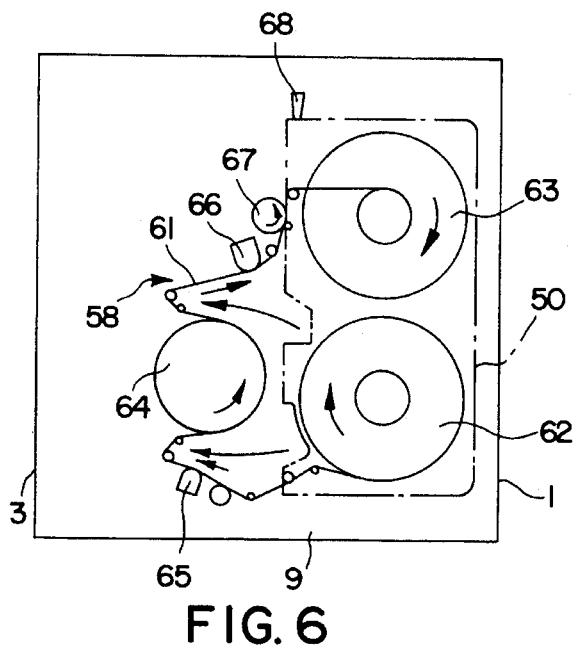
FIG. 6 is an explanatory diagram of internal structure of VCR deck.
Figure 7:
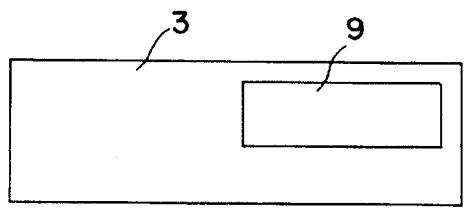
FIG. 7 is a front view of the VCR deck.

In FIG. 2 and FIG. 3, part 51 is a photo sensor of a remote control device, part 52 is a power lamp, part 53 is a power switch, part 54 is a handle, part 55 is a speaker, and part 56 is an earphone jack.

In the constitution of the television system of this invention, since the chassis 1 mounting the VCR deck 3, disc player 4, tape deck 5 and radio tuner 6 is fixed in the cabinet 2 which comprises the cathode-ray tube 8, the media of the VCR deck 3, disc player 4 and tape deck 5 can be used with only one unit, and it is also possible to receive radio and television broadcasts, and to enjoy the video and music can be enjoyed readily.

Moreover, in the VCR deck 3, the media loading slot 9 for inserting the tape cassette 50 in the longitudinal direction is provided at the right side of the front of the VCR deck 3, and the VCR deck 3 is located at the left side of the television system as seen from the front of the television system, so that the media loading slot 9 is located near the central part of the chassis 1. As a result, the mechanical parts of the VCR deck 3 are located at the left outer side of the media loading slot 9, so it is not necessary to cover the mechanical parts, thereby the lid 12 may be reduced in size.

Further, since the media loading slot 9 is at the right side of the VCR deck 3 as seen from the front side of the VCR deck 3, and the mechanism 58 is located at the left side, and therefore, when inserting the VCR tape cassette, the cover unlock button 59 of the VCR tape cassette is positioned deep inside the VCR deck 3. Hence, the cover unlock pin 68 does not interfere the cassette loading action, which allows smooth loading.

(Embodiment 2)

The second embodiment of the invention is described below while referring to FIG. 11.

Figure 11:
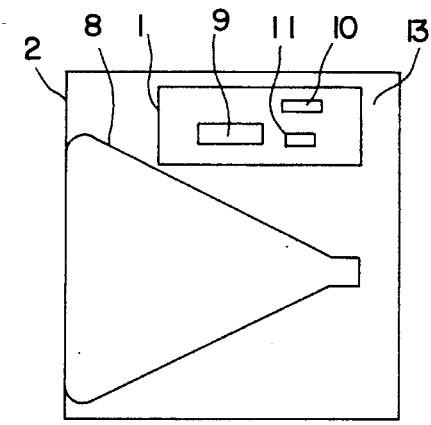
FIG. 11 is a schematic side view of a television system in the second embodiment of the present invention.

As shown in FIG. 11, the chassis 1 is disposed in a space 13 between the top plate of the cabinet 2 and the cathode-ray tube 8, and the media loading slots 9 to 11 are disposed so as to open to the right side of the cabinet 2.

As a result, the extra space 13 between the top plate of the cabinet 2 and the cathode-ray tube 8 is utilized to dispose the chassis 1 therein, so that the television set may be reduced in size, being higher in mounting density.

(Embodiment 3)

Figure 12:
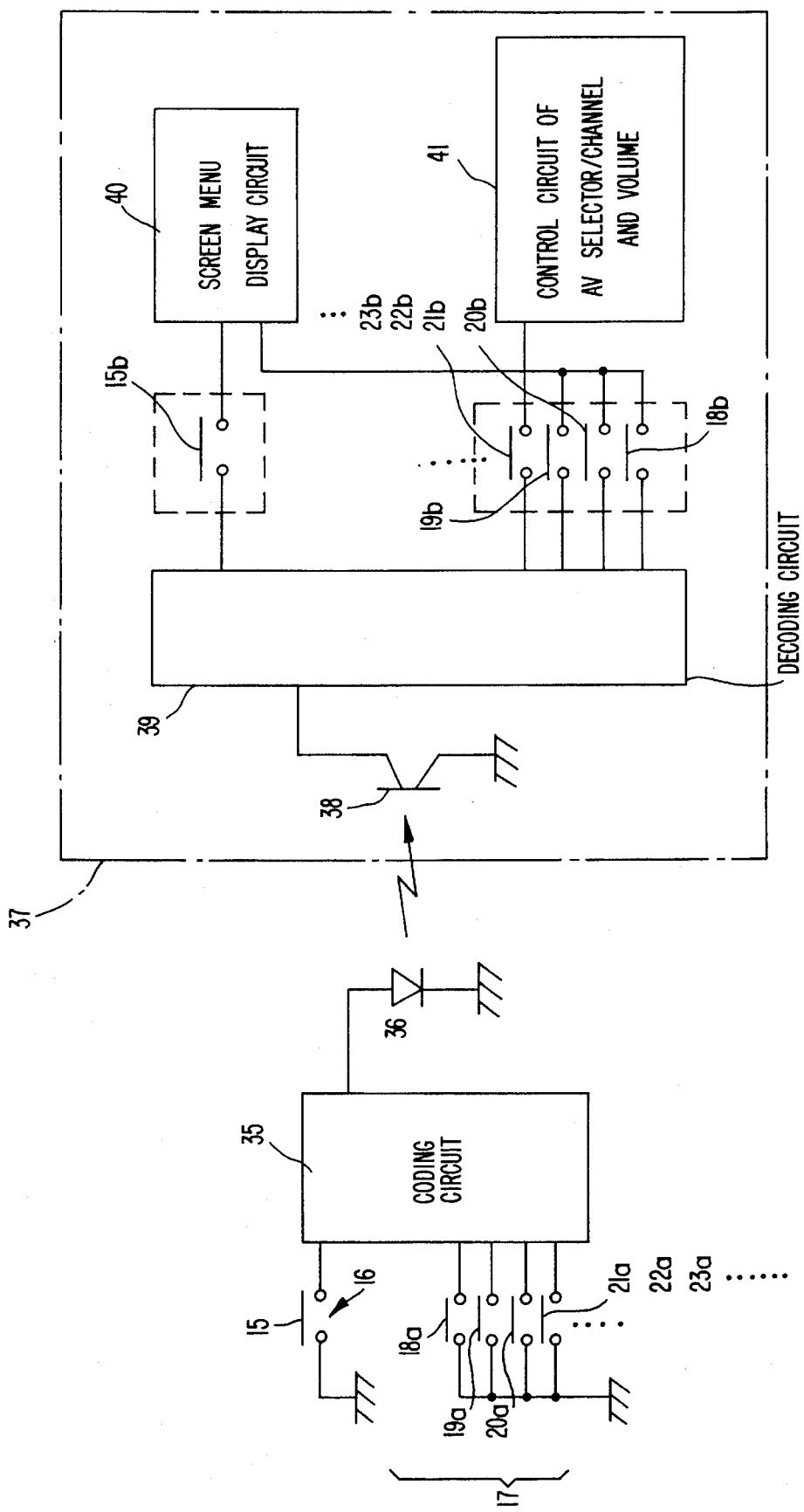
FIG. 12 is a circuit block diagram of the third embodiment of the present invention.

As the third embodiment of the invention, an example of remote control device of television system is explained by reference to FIG. 12 and FIG. 13.

The remote control device comprises a case 15, first switch means 16, and second switch means 17.

The case 15 is a hand-held size. In FIG. 13 operation buttons are: a television/video changeover button 18, a radio-tape changeover button 19, a CD selection button 20, a power off red button 21, a help button 22 for calling the display of the method of use on the cathode-ray tube, a screen status setting button 23, a volume control button 24, a channel selection button 25, a pause button 26, a record button 27, a play button 28, a rewind button 29, a fast-forward button 30, a stop button 31, search buttons of tape and disc 32, 33, and a cursor switch button 34 for moving the cursor on the screen.

By pressing the button 22, the image of the remote control device is shown on the screen of the cathode-ray tube, and the explanation of operation is displayed on the screen to help the user.

The first switch means 16 is a contact detecting switch provided in the case 15 for displaying the menu screen on the television device 37 by detecting the change of electric capacity or pressure caused by touching the case 15 by hand. The first switch means 16 is connected to a coding circuit 35, and an infrared light emitting diode 36 is connected to the output end of the coding circuit 35.

The second switch means 17 is a selection control switch of the television system 37, the VCR deck 3, disc player 4, tape deck 5, radio tuner 6, and television (not shown) in the television system 37. In this embodiment, it possesses contacts 18a, 19a, 20a operated by the television/video changeover button 18, radio/tape changeover button 19, and CD button 20. Reference numeral 21a and the following are plural control switch contacts for channel selection, volume and other controls expressed by operation buttons 21 to 34.

In the television system 37, infrared sensor 38 for receiving the signal-light from the infrared light emitting diode 36 is connected to a decoding circuit 39, and the contact is detected when the case 15 of the remote control device is held by hand, and the first switch means is turned on, and the switch 15b is closed by receiving the signal of the first switch means 15, and a screen menu display circuit 40 is operated, so that the menu screen appears on the cathode-ray tube.

In succession, by manipulating the second switch means 17 for selecting the devices of the VCR deck 9, disc player 4, tape deck 5, radio tuner 6 or television (now shown), the switch 18b is turned on by receiving the signal from the switch 18a, the switch 19b by receiving from the switch 19a, the switch 20b by receiving from the switch 20a, and the switch 21b from the control switch 21a, respectively, and as the switches 18b, 19b, 20b are turned on, the devices corresponding to the switches are selected, and the corresponding device state is shown on the screen. In addition, as the contact 21b is turned on, a control circuit 41 of AV selector/channel, volume is operated.

In this constitution, the television system of this invention can be readily controlled by only one remote control device. The menu can be displayed on the screen of the television system 37 only by touching the case 15 without manipulating operation buttons, thereby facilitating the operation and curtailing the number of buttons. Moreover, it saves the botheration of pressing the button to show the menu screen, so the menu screen is displayed only by touching the remote control device case in hand.

(Embodiment 4)

Figure 14:
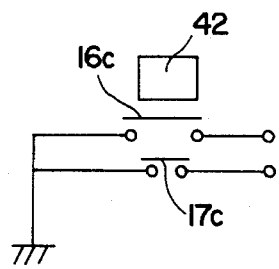
FIG. 14 is a partial circuit diagram of the fourth embodiment of this invention.

The fourth embodiment of this invention, relating to a remote control device, is described by reference to FIG. 14.

The remote control device comprises first switch means 16c for only displaying the present device's menu screen on the television system 37, and second switch means 17c for selecting the device of the VCR deck 3, disc player 4, tape deck 5, radio tuner 6, and television (not shown) of the television system 37. The first switch means 16c and second switch means 17c are stacked up in vertical direction. In this constitution, depending on the pressing force on the same button 42, the first and second switches can be individually controlled in on/off position, and the same button 42 is used for calling the menu screen or selecting the device.

Figure 13:
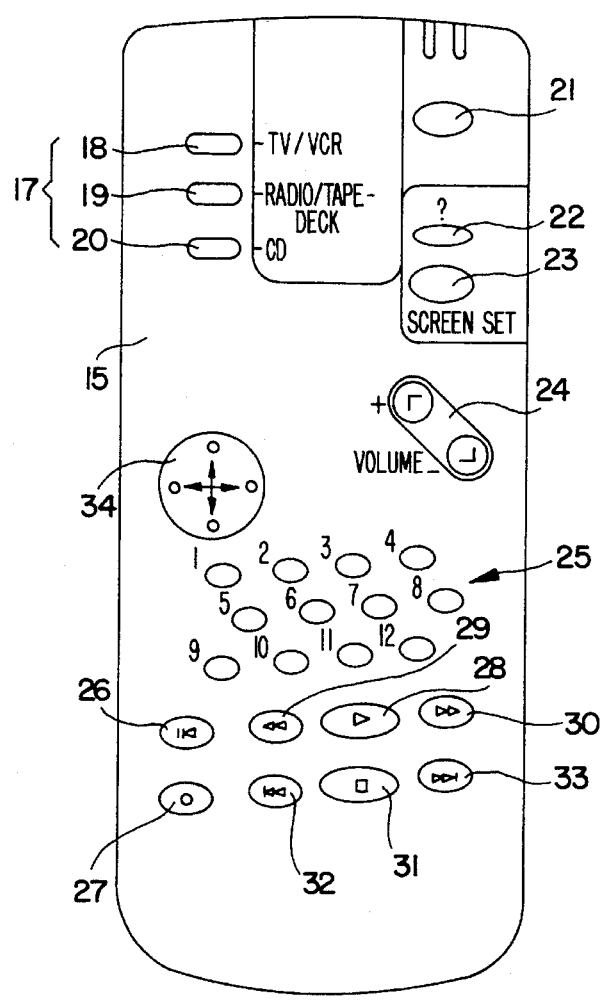
FIG. 13 is a front view of a remote control device.

In cooperation with the action of the first switch 16c, the picture of the face of the remote control device in FIG. 13 appears on the screen of the cathode-ray tube 8, and the picture of the button in the display corresponding to the button presently pressed down of the remote control device is indicated, for example, by red color or flickering, and successively in cooperation with the action of the second switch means 17c, by changing from red light of the button to blue color or changing the flickering cycle respectively, so the state of the switch can be confirmed easily.

Thus, by manipulating the first switch means 16c and second switch means 17c, it is easy to manipulate because display of screen menu and selection of device can be done by a same button, so that the number of buttons of the remote control device can be curtailed.

(Embodiment 5)

The fifth embodiment of the invention is described while referring to FIG. 15.

The remote control device possesses selection operation buttons 18 to 20 corresponding to the switch means 17 for selecting the VCR deck 3, disc player 4, tape deck 5, radio tuner 6, and television (not shown) of the television system 37, and identification marks 44 to 46 corresponding to the devices are carved in relief on the surfaces of the selection operation buttons 18 to 20.

FIG. 15(a) shows a mark 44 on the surface of the television/video button 18 in FIG. 13, and the pattern symbolizing the television set is carved in relief, and only by touching with one's finger, one can realize it to be the television/video button. FIG. 15(b) shows the mark 45 on the surface of the radio/tape button 19 in FIG. 13, and the pattern symbolizing the radio and cassette is carved in relief so that it may be recognized only by touching. FIG. 15(c) shows the mark 46 of the front face of the CD button 20, and a pattern of a disc is formed in relief so that it may be recognized only by touching.

Accordingly, only by touching the identification marks 44 to 46 of the operation buttons with finger, the selection button can easily be distinguished, so that it is easy to operate even in darkness.

Moreover, when the television/video button 18 is selected, an icon 47 in the same shape which is carved on the television/video button 18 appears in the upper right corner of the television screen, and corresponding icons appear when the radio/tape button 19 or CD button 20 is pressed. That is, on operating the buttons 18 to 20, the same icon as the selected operation button is displayed immediately, so that the selection can be known securely.

(Embodiment 6)

The sixth embodiment of the invention is described below while referring to FIG. 13 to FIG. 22.

This television system comprises a VCR deck, a disc player, a tape deck, a radio tuner, and a television set, and hence the operation is complicated, so to eliminate this inconvenience, it is designed to tell the status of the device and the method of operation thereof to the user by using the screen of the television system, so that even a person unfamiliar with the operation of machine may easily manipulate each device.

That is, the signal from the remote control device is received by the television system, and the menu screen and the screen corresponding to the operation of the selected device are displayed. Then by receiving instruction signal from the remote control device, a microcomputer provided in the television system controls the devices. In each display, by pressing the button 22 for displaying the method of use on the screen, the display is moved to the next menu screen (for example, from the display shown in FIG. 17(a) to one in FIG. 18(a)).

For example, when the menu screen display is commanded by the remote control device, if channel four of television broadcasting have been selected, the screen display becomes as shown in FIG. 16(a), and if the play of VCR deck has been selected, the screen display becomes as shown in FIG. 16(b). More specifically, the icon 47 corresponding to the selected device, and the display 48 indicating the reception channel and state of device are shown in the upper right corner of the screen.

When the tape deck is selected, the screen shown in FIG. 17(a) is displayed, when the radio is selected, the screen shown in FIG. 17(b) is displayed, and when the disc player is selected, the screen shown in FIG. 17(c) is displayed on the cathode-ray tube. Individually, the corresponding icon 47 and display 48 showing the state of device appear. The hatched area is the selected part, which is practically easily recognized, for example, by changing the color of said selected part.

FIG. 18 to FIG. 22 display the shown screens for manipulating the devices by selecting the tape deck, radio, disc player, television and VCR deck, respectively, and the display 49 of mark, character, numeral or the like corresponding to the selected device, and the cursor 50 corresponding to the cursor switch button 34 of the remote control device are displayed, and by manipulating the button of the remote control device according to the screen display 49, the operation of each device can be controlled.

More specifically, FIG. 18(*a*) shows a play menu screen of tape deck, FIG. 18(*b*) shows a record menu screen of tape deck, FIG. 19 is a radio station selection menu screen, FIG. 20 shows a track selection menu screen of disc player, and FIG. 21 shows a television setting menu screen.

For example, when the radio is selected by manipulating the remote control device, the radio station selection menu screen shown in FIG. 19 appears on the cathode-ray tube. Herein, the station is selected by cursor button or numeric button. The selected broadcast station is displayed on the screen, (in this picture No. 4 station is selected) so that it can be confirmed easily.

Hence it enables to present a television system in which each device can be manipulated easily even by a person not familiar with the manipulation of devices.

(Embodiment 7)

The seventh embodiment of this invention is described below by reference to FIG. 22.

The television system comprises a VCR deck, a disc player, a tape deck, a radio tuner, and a calendar function, and it is designed to control the device in response to the calendar function.

FIG. 22 is a block diagram showing the constitution of the television system of this invention.

A remote control device 51 comprises main power switch means 52 for turning on or off the main power source, device switch means 53 for selecting the devices such as VCR deck, disc player, tape deck, radio tuner and television, channel switch means 54 for selecting the channel of devices, date setting switch means 55 for setting the date and time, and signal send means 56 for coding the signals from these switch means for sending as optical signals.

A main body 57 of television system is described below.

Part 58 is a signal receive means, which receives and decodes the coded signals from the remote control device 51, and transmit selection signals from the remote control device 51 to a control means 65. Part 59 is power control means of devices, and is designed to turn on or off the devices depending on the signals for selecting the devices. Numeral 60 denotes channel selection control means, and the channel is selected according to the channel selection signal.

Numeral 61 denotes clock function means, comprising a memory 62 for storing the calendar information such as year, month, day, and day of week, and the present date and time are set according to the calendar information from the memory 62 and the date setting signal from the signal receive means 58.

Numeral 63 denotes memory means, which stores the selection of historical information of devices and channel selection in relation to the date and time information set in the clock function means 61, for example, the information in a period of one week or one month. Numeral 64 denotes preset memory means for preliminarily setting desired reception channel information, which stores the starting time and channel of a popular program or the like.

Numeral 65 denotes control means for controlling the power control means 59 of each device and channel selection control means 60 on the basis of the selection of historical information of each device corresponding to the date and time stored in the memory means 63 and the channel selection historical information. By this control means 65, the program which has been watched most in the past selected on the basis of the history of the device selection information and channel selection information in the latest week or month stored in the memory means 63, and the device and the channel of the device are automatically determined.

The control means 65 is designed to give priority to the channel information stored in the preset memory means 64 in deciding the device and channel to be selected. Furthermore, the selection of the device and determination of the channel of the device by the control means 65 are done automatically when the power source is turned on, and the favorite device and channel are selected without requiring user's selection of the device. In selection of device and determination of channel by the control means 65, whether the majority decision value by the information from the memory means 63 is selected or the preset memory means 64 is selected may be changed over by installing changeover means separately. Instead of determining the selection of device and decision of channel at the time of turning on the power source, it may be designed to be determined in the usual state of use.

In this constitution, when viewing the television broadcast, for example, the video device or receiving channel suited to the daily habit of the user may be selected automatically, so that a television system closely fitted to the user's lifestyle can be presented.

What is claimed:

1. A remote control device for use with a television comprising:

display instruction means for signaling said television to display a menu which includes a plurality of menu items, selection means for selecting one of said plurality of menu items, and a case in which said display instruction means and said selection means are located, said display instruction means including a contact detecting switch which is actuated responsive to a change of electric capacitance caused by a user touching said case.

2. A remote control device for use with a television comprising:

first switch means for signalling said television to display a menu which includes a plurality of menu items; and second switch means for selecting one of said plurality of menu items, wherein said first switch means and said second switch means are both actuated by pressing a single button and are each individually controlled responsive to respective pressing forces applied to said single button.

3. A television system comprising:

a cabinet possessing a display means; and a chassis incorporating a plurality of components including a VCR deck, a disc player, a tape deck, and a further plurality of components including a television tuner and a radio tuner, said chassis being fixed to said cabinet, wherein each of said plurality of components has a respective media loading slot in front thereof, wherein a VCR tape cassette is loaded into said media loading slot of the VCR deck in the longitudinal direction so that a shortest side of said VCR tape cassette is inserted into said slot first and said respective media loading slot of said VCR deck is disposed at the right side of the front of said VCR deck, said VCR deck is positioned at the left side as seen from the front of said chassis, said disc player and said tape deck are stacked and mounted on said chassis and disposed at the right side of said chassis as seen from the front of the chassis, and said chassis is fixed in said cabinet with each respective media loading slot facing the same direction as the front of said display means faces.

4. A television system comprising:

a television set having a display means and a plurality of devices including, a television tuner and at least one of a VCR deck, a disc player, a tape deck, and a radio tuner, a remote control device for sending a control signal to said television set, wherein said remote control device comprises:

first switch means for causing said television set to display on said display means a menu for each of said plurality of devices, second switch means for selecting and controlling one or more of said VCR deck, said disc player, said tape deck, said radio tuner and said television tuner, a case including said first and second switch means, wherein said first switch means includes a contact detecting switch which is actuated responsive to a change of electric capacitance caused by a user touching said case.

5. A television system comprising:

a television set having a display means, and a plurality of components including a television tuner and at least one of a VCR deck, a disc player, a tape deck, and a radio tuner, a remote control device for sending a control signal to said television set, wherein said remote control device comprises:

first switch means for causing said television set to display on said display means a menu for each of said plurality of devices on said display means, wherein said first and second switch means are actuated by a single button and controlled individually responsive to respective pressing forces applied to said single button.

6. A television system comprising:

a television set having a display means and a plurality of components including, a television tuner and at least one of a VCR deck, a disc player, a tape deck, and a radio tuner, a remote control device for sending a control signal to the television set, wherein said remote control device comprises:

operation buttons for selecting any one of said VCR deck, disc player, tape deck, radio tuner and television tuner, wherein identification marks corresponding to figures of said plurality of components are formed in relief on the surfaces of the operation buttons.

7. A television system as claimed in claim 6 wherein said display means displays any of said identification marks correspondingly to the respective one of said operation buttons being pushed.

8. A television system comprising:

a cabinet possessing a display means; and a chassis incorporating a plurality of components including a television tuner, a VCR deck, a disc player, tape deck, and a radio tuner, said chassis being fixed to said cabinet, a remote control device for sending a control signal to said plurality of components, said remote control device comprising:

main power switch means for turning on and off a main power source of said television system, device switch means for selecting one of said plurality of components, a channel switch means for selecting channels on each of said plurality of components based on selection information and, signal send means for coding and sending signals from said switch means, and said television system further comprising:

signal receive means for receiving and decoding coded signals from said remote control device, power control means for turning on and off a respective power source of each device on the basis of respective signals from said switch means, channel selecting control means for generating a channel selection signal corresponding to channel selection information to select channels, clock function means having a memory for storing calendar information and including a clock for providing date and time, memory means for storing selection information for each device and channel selection information in relation to the date and time, and control means for controlling the power control means and channel selecting control means on the basis of said selection information and said channel selection information corresponding to said date and time stored in said memory means.

9. A television system as claimed in claim 8, wherein said control means selects said device and said channel of said device when said television system is on, on the basis of present time and a history of the selection information and channel selection information of said devices stored in said memory means.

10. A television system as claimed in claim 9, wherein said control means is designed to select said device and said channel of said device on the basis of device selection and channel selection frequency made at a past corresponding time.

11. A television system as claimed in claim 9, wherein said memory means further comprises preset memory means for storing selection information and channel information, and wherein control by said control means is priority based in accordance with selection information and channel information stored in said preset memory means.

12. A television system comprising:

a television set having display means, a television tuner and a main power source, a remote control device for sending a control signal to said television set, wherein said remote control device comprises:

main power switch means for turning on and off said main power source of said television set, a channel switch means for generating a channel selection signal corresponding to channel selection information to select a channel on said television set and, signal send means for coding and sending signals from said channel switch means, said television system further comprising:

signal receive means for receiving and decoding said coded signals from said remote control device, power control means for turning on and off said main power source responsive to said channel selection signal, clock function means having a memory for storing calendar information and having a clock for providing a date and time, memory means for storing said channel selection information in relation to the date and time, and control means for controlling the power control means and channel switch means on the basis of said channel selection information corresponding to said date and time stored in said memory means.

13. A television system as claimed in claim 12, wherein said control means selects said channel of said television set when said television set is on, on the basis of time and channel selection information previously stored in said memory means.

14. A television system as claimed in claim 13, wherein said control means selects a channel of said television set on the basis of the frequency of channel selections made at a past corresponding time.

15. A television system as claimed in claim 13, wherein said memory means further comprises preset memory means for storing channel selection information, and said control means assigns priority to channel selection based upon channel selection information stored in said preset memory means.

* * * * *

UNITED STATES PATENT AND TRADE MARK OFFICE
CERTIFICATE OF CORRECTION

PATENT NO. : 5,488,427
DATED : January 30, 1996
INVENTOR(S) : Kayashima et al.

It is certified that error appears in the above-identified patent and that said Letters Patent is hereby corrected as shown below:

Column 8, line 36, delete "signaling" and insert --signalling--.

Signed and Sealed this

Sixteenth Day of July, 1996

Attest:

BRUCE LEHMAN

Attesting Officer      Commissioner of Patents and Trademarks